ULTRASONIC DELAY LINE

Filed Nov. 17, 1958

INVENTORS
HERBERT L. HOOVER
AND NEIL D. VAN DYKE

BY Clarence R. Patty, Jr.
ATTORNEY 3,051,915

ULTRASONIC DELAY LINE

Herbert L. Hoover and Neil D. Van Dyke, Corning, N.Y., assignors to Corning Glass Works, Corning, N.Y., a corporation of New York Filed Nov. 17, 1958, Ser. No. 774,252
4 Claims. (Cl. 333—30)

Figure 1:
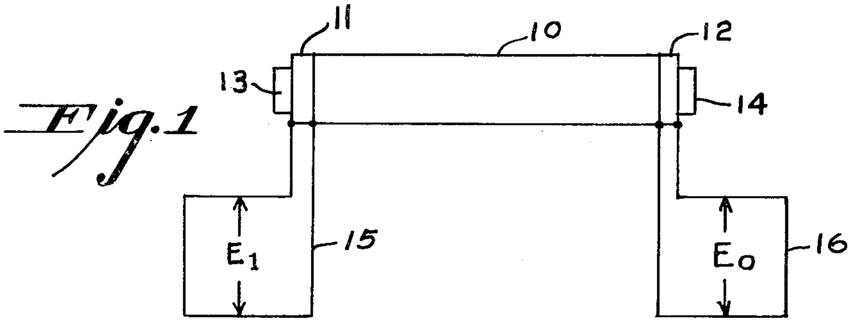

This invention relates to ultrasonic delay lines composed of vitreous silica, and is particularly concerned with improvements in the transmission characteristics of such delay lines.

Delay lines are widely used in radar, computer and similar devices, including those of an electronic memory character, where it is desired to delay, or temporarily store, signals during transmission. A delay line assembly is essentially composed of an acoustic transmission medium, that is, the delay line, and a pair of piezoelectric transducer crystals affixed thereon to serve as input and output terminal members in connecting the line into an electrical signaling circuit. Conventional delay lines are usually in the form of a straight rod or a flat plate having a plurality of peripheral facets, the particular form and configuration depending largely on the degree of time delay required.

In delay line operation, an electrical signal is applied across the input crystal, causing this crystal to vibrate mechanically in accordance with the well-known piezoelectric phenomenon. The vibrations, thus produced, are transmitted through the delay line, with the transmission time constituting the required signal delay or storage time. Upon reaching the output crystal, the vibrations are reconverted into an electrical signal corresponding to the original signal introduced at the input crystal. In general, delay lines transmit over a range or band of frequencies, a range of 15–25 megacycles per second being frequently employed and the delay line assembly designed accordingly.

In transmitting a signal through a delay line, it is desirable to achieve a maximum degree of signal transmission and fidelity; that is, the reconverted or output signal should correspond as closely as possible to the input signal initially generated in the circuit. This requires both proper constructional design and proper selection of material. As is well known, proper design may vary with the particular application involved. The present invention, however, is concerned with materials rather than design, and hence is not related or restricted to a particular design.

In terms of transmission characteristics, the suitability of a material for delay line production is primarily determined on the basis of two reference standards, or factors, known in the art as band pass smoothness and signal attenuation. The former relates to degree of selective wave loss or dissipation at certain frequencies within the range being transmitted. Such selective loss results in a distorted signal, that is, one lacking in fidelity, and is frequently referred to as producing "jags" because of the jagged appearance in a graphical illustration of transmission characteristics. The latter refers to a general loss or dissipation over the entire frequency range, resulting in a generally clear but low level signal that may be too weak for amplification.

Of the various liquids and solids proposed for delay line use, it is generally accepted that vitreous silica materials are most suitable for the purpose. Such materials are composed of substantially pure silica, are prepared by a fusion process, and include materials commonly referred to as fused quartz and fused silica.

The former may be prepared by fusion of natural crystalline quartz particles in a suitable melting chamber. Alternatively the crystalline material may be powdered and passed through a combustion burner to form fused particles which may be collected in the form of a boule. However, an undesirably high degree of signal attenuation is frequently encountered in delay lines produced from fused quartz unless special care is taken in purifying the crystalline material and in the fusion process. This attenuation is believed to result from inhomogeneities either of a chemical nature, such as alkaline oxide impurities, or of a structural nature due to incomplete fusion and blending of the original particles.

The synthetic material known as fused silica may be produced by burning a volatile silicon compound to form molten silica particles which are deposited in the form of a vitreous boule. The boule thus formed is cut into delay line blanks of any desired shape and size.

Such delay lines characteristically have a low degree of signal attenuation, provided that pure raw materials are used and care is otherwise taken to insure a pure and homogeneous vitreous silica. This permits production of delay lines that provide relatively long delay times. It also indicates that chemical impurities and/or structural inhomogeneities are a principal factor in signal attenuation. On the other hand, both fused quartz and synthetic silica delay lines frequently exhibit such a degree of selective wave interference, or band pass "jags," as to be unsuitable for use.

In summary then, vitreous silica materials are desirable delay line materials, but such delay lines may be rendered unsuitable, either by a high degree of signal attenuation, or by selective attenuation or band pass jags, due to inhomogeneities or variations in the materials as produced.

It is a purpose of the present invention to provide vitreous silica delay lines having improved transmission characteristics. A further purpose is to provide a method of improving such characteristics. It is a further purpose to provide a method of homogenizing vitreous silica delay lines. Another purpose is to minimize signal attenuation and selective ultrasonic wave loss in vitreous silica delay lines.

The invention resides in an ultrasonic delay line composed of a vitreous silica material which has been subjected to an electrical current at an elevated temperature to modify the ultrasonic transmission characteristics. It further resides in a method of electrically treating vitreous silica materials whereby such improvement is effected.

Figure 2:
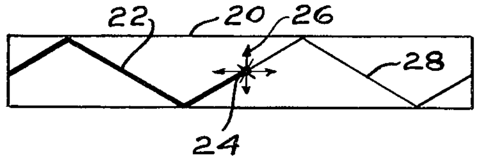
Figure 3:
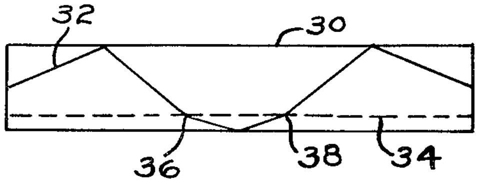
Figure 4:
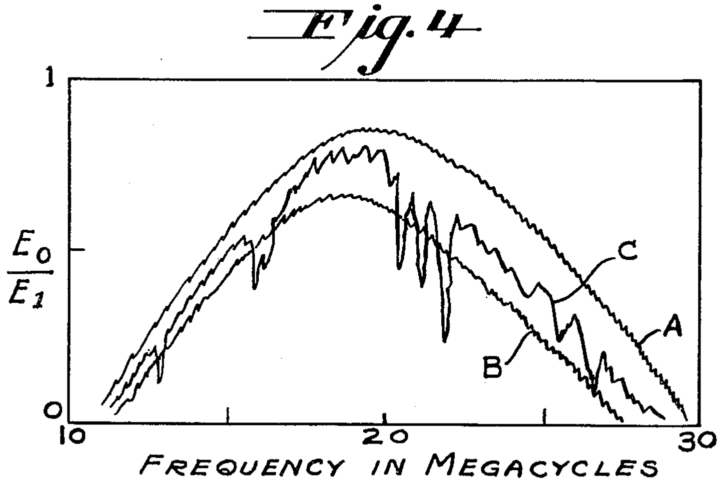

The invention will be further described with reference to the accompanying drawing, wherein, FIG. 1 is a schematic illustration of an assembled delay line system, FIGS. 2 and 3 illustrate the effect of inhomogeneities on signal transmission in a delay line, and FIG. 4 is a graphical illustration of transmission characteristics in the delay lines of FIGS. 2 and 3.

A typical delay line system, as schematically illustrated in FIG. 1, includes a delay line 10, transducer crystals 11 and 12, backing members 13 and 14, and electrical input and output circuits 15 and 16. Delay line 10 may be a single rod or plate of a vitreous silica material. Crystals 11 and 12 are composed of a piezoelectric material and are sealed to, or otherwise maintained in tight contact with, facets on delay line 10. Backing members 13 and 14 are firmly attached to crystals 11 and 12 respectively. Circuits 15 and 16 are shown diagrammatically and may include a signal generator, amplifiers and such other circuit components as required. Inasmuch as the invention is concerned with improving delay line materials, a schematic illustration is employed to indicate general applicability with respect to delay line form and assembly.

Crystal 11 is connected in series in circuit 15 so that the passage of an electric impulse or signal through the circuit imposes a voltage $E_I$ across the crystal. In known manner this produces mechanical vibrations within crystal 11 which are transmitted from the crystal through delay line 10. The effect of backing member 13 is to broaden the transmission frequency range. Crystal 12 receives the transmitted vibrations or acoustic signal from delay line 10 and, in conjunction with its backing member 14, converts this acoustic signal into an electrical signal in circuit 16. This creates a voltage $E_0$ in circuit 16, and the difference between $E_I$ and $E_0$ represents the attenuation or signal loss occurring in delay line 10 and associated assembly.

As is well known, the transmission of a vibration or acoustic wave through a delay line follows optical laws relating to light waves. As an acoustic wave reaches the walls or peripheral surfaces of the delay line, it will be reflected back and forth until it ultimately reaches the output crystal.

Inasmuch as the present invention is concerned with improving deficiencies in signal transmission, an attempt is made to explain, in conjunction with FIGS. 2 and 3, what is currently believed to occur when signal transmission interference is encountered in a delay line. It will be understood that these figures are merely pictorial illustrations.

The condition referred to earlier as signal attenuation may be explained as resulting from wave dissipation during transmission. Such dissipation is thought to occur when a wave encounters an impurity center or inhomogeneity of atomic or molecular size in a delay line. Thus, when an acoustic wave in a silica delay line encounters an alkali metal ion, for example, a portion of the energy of the wave is dissipated into the surrounding medium, with the energy level of the continuing wave being decreased to the extent of the dissipation. This is pictorially illustrated in FIG. 2 wherein a delay line 20 is shown with an acoustic wave 22 traveling along a reflected path. As the wave reaches an impurity center 24, a portion of the wave, along with its energy, is dissipated as shown by arrows 26. The reduced energy level of the wave is indicated by the lighter line 28 leaving the impurity center.

The transmission effect referred to earlier as jagged band pass or selective wave loss is illustrated in FIG. 3. This effect may be encountered in all types of silica delay lines, as earlier indicated, and appears to be associated with changes in physical properties, such as refractive index, density, etc. It is frequently observed to occur in a delay line cut from a silica body having a layered structure in which physical properties change slightly from one layer to the next. A plane separating unlike layers is indicated by a dotted line 34 in delay line 30 with an acoustic wave 32 traveling through such delay line along a reflected path. Neither the precise nature of the differences between layers nor their effects on acoustic waves have been conclusively explained. While apparently manifested in physical changes, there is evidence to indicate that such differences result from a change in the silicon oxidation level, or similar chemical change, in the material.

The effect on acoustic transmission is sometimes referred to as selective absorption, but there is reason to believe that what actually occurs is more in the nature of path bending or lengthening, as illustrated where wave 32 crosses inhomogeneity plane 34 at 36 and 38, with resultant alteration of the wave pattern rather than actual loss, although the latter may also occur to some extent. In any event the net effect is to produce a severely distorted signal due to wave interference or alteration.

In the graph of FIG. 4 the ratio of output to input voltage, that is $E_0/E_I$, is plotted against vibration frequency in a delay line system such as illustrated in FIG. 1. In such a graphical illustration the voltage ratio constitutes a measure of intensity of a signal transmitted through the delay line. The three curves A, B and C are general in nature and are designed to illustrate typical conditions which may exist in delay lines as described above. Each curve is based on, and typifies, a large number of curves plotted from data obtained by measuring a number of different delay lines, and each may be considered as a composite or typical curve.

Curve A illustrates transmission of a signal in a system designed to vibrate at frequencies of 15–25 megacycles. Actually, ideal transmission is never achieved, there being some slight degree of interference in any delay line due to the inherent geometry of the line. This is indicated by the slight waviness in the curve.

Curve B illustrates a type of transmission obtained in a material containing uniformly distributed chemical or physical inhomogeneities such as discussed with reference to the delay line of FIG. 2. Curve B follows the general form of Curve A, but is considerably lower on the graph. This indicates energy loss occurring at all frequencies and illustrates signal attenuation which may result in a transmitted signal that is too weak to be properly amplified.

Curve C illustrates a condition of jagged band pass such as described with reference to FIG. 3. In this case, there is little attenuation of the type illustrated by Curve B. Rather, the curve is typified by peaks and valleys. While an adequately strong signal may be obtained from such transmission, the character or fidelity of the signal is severely distorted.

Both of these conditions, overall signal attenuation and jagged or selective absorption, may occur together in a material. There is, however, no apparent relationship between them since either may also be obtained to the virtual exclusion of the other. We have now discovered, quite surprisingly, that either or both of these deleterious conditions may be minimized in a vitreous silica delay line by application of an electric current across the silica body at an elevated temperature. It is on this discovery that our invention is based.

Alkali metal ions are capable of migrating within a vitreous material and such ions are found concentrated at one electrode after the electrolytic treatment of the present invention, provided they are present as impurities. This fact supports the theory proposed above that signal attenuation is due to such impurities and is improved by their removal.

On the other hand, it is known that the condition of selective wave loss occurs in fused materials wherein the chemical impurity levels are so low as to be virtually incapable of measurement. Thus, this condition apparently results from changes in production conditions rather than changes in production materials. Such evidence indicates the possibility of a variation in silicon oxidation level, change in density, or the like as noted earlier. Strangely enough we find that an electrical current will also minimize this condition, whatever its nature. In either event, it appears that the effect is to render the delay line material more homogeneous and hence better capable of transmitting a clear, strong signal.

By way of further illustrating the present invention the following specific example is described. A cylindrical boule of fused silica was sliced into thin disc-like blanks approximately 16″ in diameter and ¼″ thick. These blanks were ground to produce 20 megacycle delay lines having a delay time of 2,780 microseconds. On test, however, it was found that a number of the delay lines cut from the boule were unsatisfactory due to extremely jagged band pass curves of the type shown as Curve C in FIG. 4. Each rejected line was then assembled in an electrical circuit with platinum foil electrodes in intimate contact with the opposed flat faces, that is the 16 inch diameter surfaces, of the line. A D.C. potential of 1480 volts/cm. of line thickness was continuously applied between the electrodes and transversely through the line while the latter was held at a temperature of 1050° C.

for 24 hours. Subsequent measurements showed a markedly smoother band pass curve.

The conditions of electrical treatment may be varied considerably. With higher potentials somewhat lower temperature and/or times may be employed. Conversely, with increased temperature or time the applied potential may be smaller. In general, it is desirable to employ a temperature of 950° C. or higher and a potential on the order of 1,000 volts per cm. or greater. It is desirable, however, to avoid temperatures at or above the softening point, which will cause appreciable deformation. It is also desirable to avoid temperatures which will cause devitrification in the body, and about 1200° C. is a practical maximum which will avoid both deformation and devitrification. The period of time required in any given instance will depend on the thermal and electrical conditions selected, as well as the desired degree of alteration in acoustic properties, and, therefore, must be determined by test.

It will be understood that a silica body, such as the boule referred to above, may be effectively treated in accordance with the invention prior to being cut into delay lines, rather than subsequently, if desired. Because of the thicker body involved, a more extended time and/or higher temperature and/or higher voltage would be employed for equivalent effects.

We claim:

1. An ultrasonic delay line assembly comprising a vitreous silica acoustic transmission medium and input and output piezoelectric transducer members affixed to said medium, wherein said transmission medium is a homogenized body of vitreous silica the ultrasonic characteristics of which have been modified to reduce acoustic losses therethrough by subjecting said medium in its solid state to a direct electric current of between 1,000–1,480 volts per centimeter while at a temperature of between 950–1200° C.

2. A method of fabricating an ultrasonic delay line assembly having a vitreous silica acoustic transmission medium comprising the steps of subjecting the medium in its solid state to a temperature of between 950–1200° C. and simultaneously applying a direct electric current thereto of between 1,000–1,480 volts per centimeter to render the material homogeneous and improve the acoustic transmission therethrough and thereafter affixing input and output piezoelectric transducer members to said homogeneous medium.

3. A method of fabricating an improved ultrasonic delay line assembly having a vitreous silica acoustic transmission medium wherein the original nature of the acoustic material is such as to produce a high degree of acoustic attenuation in a transmitted ultrasonic signal, comprising the steps of treating the acoustic medium in its solid state to a temperature of between 950–1200° C. and simultaneously applying a direct electric current thereto of between 1,000–1,480 volts per centimeter and thereafter affixing a pair of piezoelectric transducer members to said treated medium as input and output terminations.

4. A method of fabricating an improved ultrasonic delay line assembly having a vitreous silica acoustic transmission medium wherein the original nature of the material of the acoustic medium is such as to produce a high degree of selective wave loss in a transmitted ultrasonic signal, comprising the steps of treating the material of said acoustic medium in its solid state to a temperature of between 950–1200° C. and simultaneously applying a direct electric current thereto of between 1,000–1,480 volts per centimeter and thereafter affixing a pair of piezoelectric transducer members to said treated medium as input and output terminations.

References Cited in the file of this patent

UNITED STATES PATENTS

| | | |
|---|---|---|
| 1,785,888 | Cox et al. | Dec. 23, 1930 |
| 2,268,823 | Herzog | Jan. 6, 1942 |
| 2,561,818 | Peyches | July 24, 1951 |
| 2,859,415 | Fagen | Nov. 4, 1958 |
| 2,897,126 | George | July 28, 1959 |

FOREIGN PATENTS

| | | |
|---|---|---|
| 1,016,416 | Germany | Sept. 26, 1957 |